United States Patent
Nakao et al.

(10) Patent No.: US 7,480,023 B2
(45) Date of Patent: Jan. 20, 2009

(54) LIQUID CRYSTAL DISPLAY PANEL IN WHICH THE RUBBING DIRECTIONS OF THE PAIR OF ALIGNMENT FILMS ARE ORIENTED TOWARD A SIDE OF A MAIN DIFFUSION SOURCE OF IMPURITY IONS

(75) Inventors: Kenji Nakao, Kanazawa (JP); Shinji Ogawa, Ishikawa-gun (JP); Hirofumi Wakemoto, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 601 days.

(21) Appl. No.: 11/138,461

(22) Filed: May 27, 2005

(65) Prior Publication Data

US 2005/0264739 A1  Dec. 1, 2005

(30) Foreign Application Priority Data

May 28, 2004  (JP) ............................. 2004-159657

(51) Int. Cl.
*G02F 1/1337* (2006.01)
*G02F 1/1333* (2006.01)

(52) U.S. Cl. .................... 349/126; 349/123; 349/94

(58) Field of Classification Search .............. 349/126, 349/123, 94
See application file for complete search history.

(56) References Cited

U.S. PATENT DOCUMENTS

| | | | |
|---|---|---|---|
| 6,678,034 B2 * | 1/2004 | Choi et al. ................ 349/172 |
| 6,753,551 B2 * | 6/2004 | Cheng ........................ 257/79 |
| 6,833,893 B2 * | 12/2004 | Kikkawa ..................... 349/117 |
| 6,873,377 B2 * | 3/2005 | Konno et al. .................. 349/33 |
| 7,030,848 B2 * | 4/2006 | Sato et al. ..................... 345/95 |
| 7,050,031 B2 * | 5/2006 | Saishu et al. .................. 345/96 |

FOREIGN PATENT DOCUMENTS

| | | | |
|---|---|---|---|
| JP | 60-205426 | | 10/1985 |
| JP | 8-129166 | * | 5/1996 |
| JP | 9-54325 | * | 2/1997 |
| JP | 10-153781 | | 6/1998 |
| JP | 2003-280005 | * | 10/2003 |
| JP | 2003-280012 | | 10/2003 |
| KR | 2002-0057812 | | 7/2002 |

OTHER PUBLICATIONS

U.S. Appl. No. 11/138,461, filed May 27, 2005, Nakao et al.

(Continued)

*Primary Examiner*—Mike Qi
(74) *Attorney, Agent, or Firm*—Oblon, Spivak, McClelland, Maier & Neustadt, P.C.

(57) ABSTRACT

An OCB mode liquid crystal display panel comprises a pair of electrode substrates, a liquid crystal layer which is held between the pair of electrode substrates and has liquid crystal molecules whose alignment state is controlled within a display area by a drive voltage applied from the electrode substrates, and a pair of alignment films which are disposed on the electrode substrates in contact with the liquid crystal layer and whose rubbing directions are set parallel to each other. The rubbing directions of the pair of alignment films are oriented toward a side of a main diffusion source of impurity ions.

9 Claims, 6 Drawing Sheets

OTHER PUBLICATIONS

U.S. Appl. No. 11/387,940, filed Mar. 24, 2006, Nakao et al.
U.S. Appl. No. 11/138,459, filed May 27, 2005, Nakao et al.
U.S. Appl. No. 11/138,461, filed May 27, 2005, Nakao et al.
U.S. Appl. No. 11/138,460, filed May 27, 2005, Nakao et al.
U.S. Appl. No. 11/138,461, filed May 27, 2005, Nakao et al.
U.S. Appl. No. 11/693,178, filed Mar. 29, 2007, Nakao et al.

* cited by examiner

FIG. 3A LCD Splay alignment

FIG. 3B LCD Bend alignment (White display)

FIG. 3C LCD Bend alignment (Black display)

LIQUID CRYSTAL DISPLAY PANEL IN WHICH THE RUBBING DIRECTIONS OF THE PAIR OF ALIGNMENT FILMS ARE ORIENTED TOWARD A SIDE OF A MAIN DIFFUSION SOURCE OF IMPURITY IONS

CROSS-REFERENCE TO RELATED APPLICATIONS

This application is based upon and claims the benefit of priority from the prior Japanese Patent Application No. 2004-159657, filed May 28, 2004, the entire contents of which are incorporated herein by reference.

BACKGROUND OF THE INVENTION

1. Field of the Invention

The present invention relates to a liquid crystal display panel having an optically compensated bend (OCB) mode.

2. Description of the Related Art

Liquid crystal display panels have widely been used as image displays for computers, automobile navigation systems, monitors and TVs. TN and STN modes using nematic liquid crystals are popular as liquid crystal display modes for the liquid crystal display panels. Other liquid crystal display modes using ferroelectric liquid crystals and the like are also known and provide a higher response speed and a wider viewing angle. These display modes, however, require further improvement in impact resistance and thermal properties. In contrast, as an optically compensated liquid crystal display mode that provides a higher response speed and a wider viewing angle, there is an OCB mode in which liquid crystal molecules are aligned in parallel without being twisted. This OCB mode is focused on use in video equipment and active development thereof has been carried out.

In general, an active matrix liquid crystal display panel has a structure in which a liquid crystal layer is held between an array substrate and a counter substrate. The array substrate includes a plurality of pixel electrodes arrayed substantially in a matrix, a plurality of scanning electrodes disposed along rows of the pixel electrode, a plurality of data signal electrodes disposed along columns of the pixel electrodes, and a plurality of switching elements disposed near intersections between the scanning electrodes and the data signal electrodes, for example. Each of the switching elements is formed, for example, of a thin-film transistor (TFT), and turns on to apply the potential of one data signal electrode to one pixel electrode when one scanning electrode is driven. On the counter substrate, a counter electrode is disposed to face the plurality of pixel electrodes arrayed on the array substrate. A pair of pixel and counter electrodes forms one pixel together with a pixel area of the liquid crystal layer, and the alignment state of liquid crystal molecules within the pixel area is controlled by the electric field corresponding to the drive voltage held between the pixel electrode and the counter electrode.

In an OCB mode liquid crystal display panel, the liquid crystal molecules are in a splay alignment before supply of power. This splay alignment is a state where the liquid crystal molecules are laid down, and obtained by alignment films which are disposed on the pixel electrode and the counter electrode and rubbed in parallel with each other. A display operation of the liquid crystal display panel begins after an initialization process for applying a transfer voltage to the liquid crystal layer upon supply of power to transfer the alignment state of the liquid crystal molecules from the splay alignment to a bend alignment by a relatively strong electric field corresponding to the transfer voltage. The alignment state of the liquid crystal molecules is maintained in the bend alignment during the display operation, so as to attain the higher response speed and wider viewing angle peculiar to the OCB mode.

In addition, the alignment state of the liquid crystal molecules is inverse-transferred from the bend alignment to the splay alignment when a long period has elapsed in a no-voltage-applied state or a voltage-applied state where a voltage is applied but this voltage is below a level at which the energy of the splay alignment and the energy of the bend alignment are balanced. In the OCB mode liquid crystal display panel, black insertion driving is employed as a driving system for preventing the inverse transfer. In black insertion driving, an inverse-transfer preventing voltage and a display voltage corresponding to a video signal are alternately applied to the liquid crystal layer as the drive voltage at every frame cycle to maintain the bend alignment. Since the OCB mode liquid crystal display panel is a display panel of a normally white mode, the inverse-transfer preventing voltage corresponds to a voltage for a black display. Thus, this driving scheme is called black insertion driving. Further, the ratio of a period of applying the inverse-transfer preventing voltage to the total period of applying the display voltage and the inverse-transfer preventing voltage is called black insertion ratio.

Figure 7A:
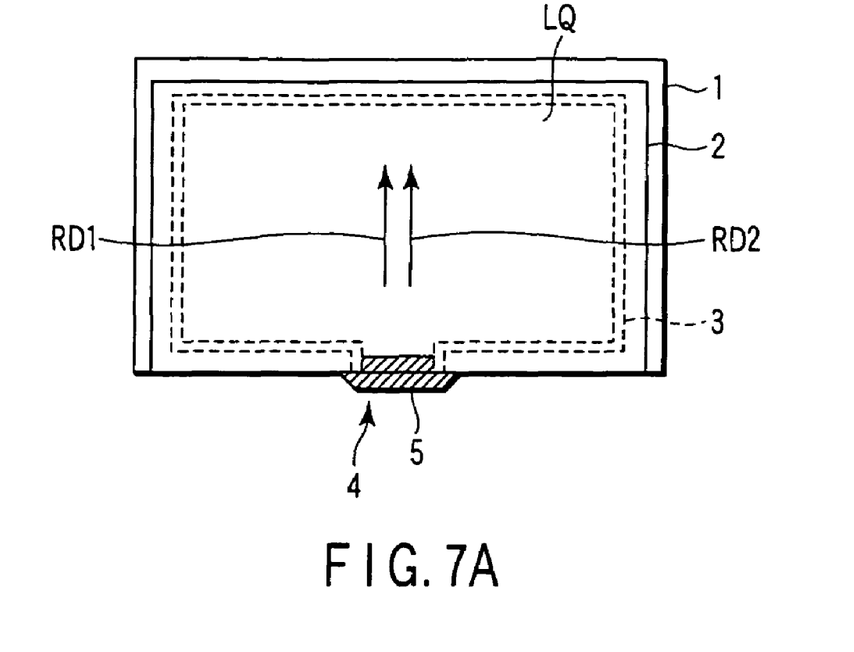
FIGS. 7A to 7D are plan views explaining a problem that occurs in an OCB mode liquid crystal display panel.

In manufacture of the liquid crystal display panel, as shown in FIG. 7A, after an array substrate 1 and a counter substrate 2 are individually formed, rubbing treatment is applied to the alignment films on the array substrate 1 and the counter substrate 2. Thereafter, the array substrate 1 and the counter substrate 2 are bonded by use of a sealing resin layer 3. The sealing resin layer 3 is applied to surround a liquid crystal filling space and form an open part left as an inlet 4. Driver circuit elements are disposed along a first side of the array substrate 1, and the inlet 4 is disposed near a second side of the array substrate 1 that is opposed to the first side. The rubbing treatment for each alignment film is carried out in the same direction from the second side to the first side so as to avoid electrostatic destruction of the driver circuit elements. In FIG. 7A, RD1 denotes the rubbing direction of the alignment film on the array substrate 1, and RD2 denotes the rubbing direction of the alignment film on the counter substrate 2. A liquid crystal material is applied from the inlet 4 to the liquid crystal filling space as the liquid crystal layer LQ, and the inlet 4 is sealed with a sealing member 5.

It is inevitable that impurity ions get into the liquid crystal layer LQ during the above-mentioned manufacturing process. Specifically, the sealing member 5 is the main impurity ion source that supplies a significant quantity of impurity ions to the liquid crystal layer LQ. Such impurity ions decrease the insulation resistance of the liquid crystal. Thus, the display characteristics are impaired due to decreased voltage retention. Further, upon application of the drive voltage, the impurity ions are moved in the liquid crystal layer LQ. When the impurity ions are distributed unevenly, an image fault such as non-uniformity in display occurs. For example, Jpn. Pat. Appln. KOKAI Publication No. 9-54325 discloses a technique of providing an ion trap electrode in addition to electrodes arranged in one direction on a substrate and sequentially applying a high potential pulse to the electrodes to prevent uneven distribution of the impurity ions. However, it is difficult to use this technique as a solution to the problem occurring in the OCB mode liquid crystal display panel.

Figure 7B:
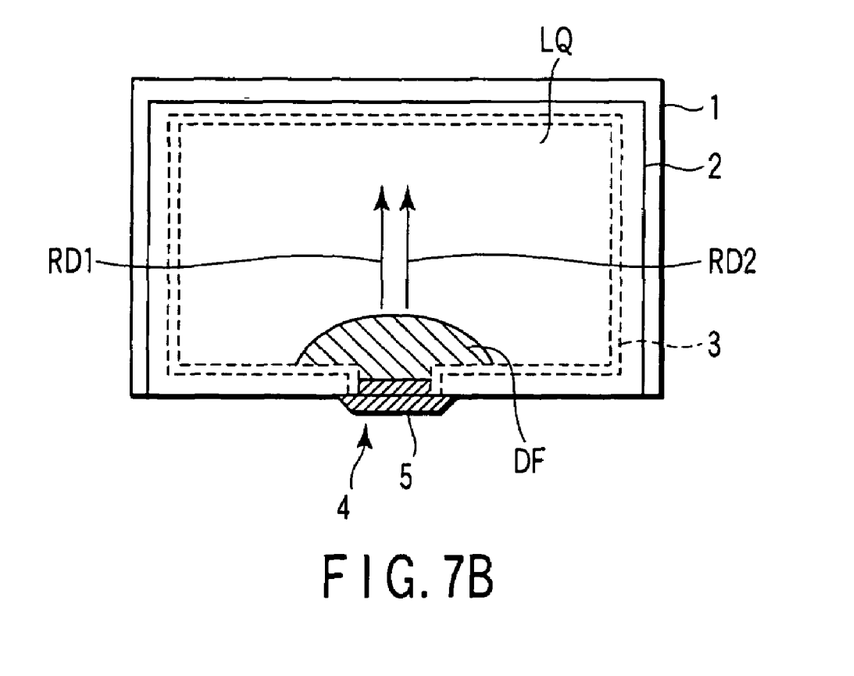
Figure 7C:
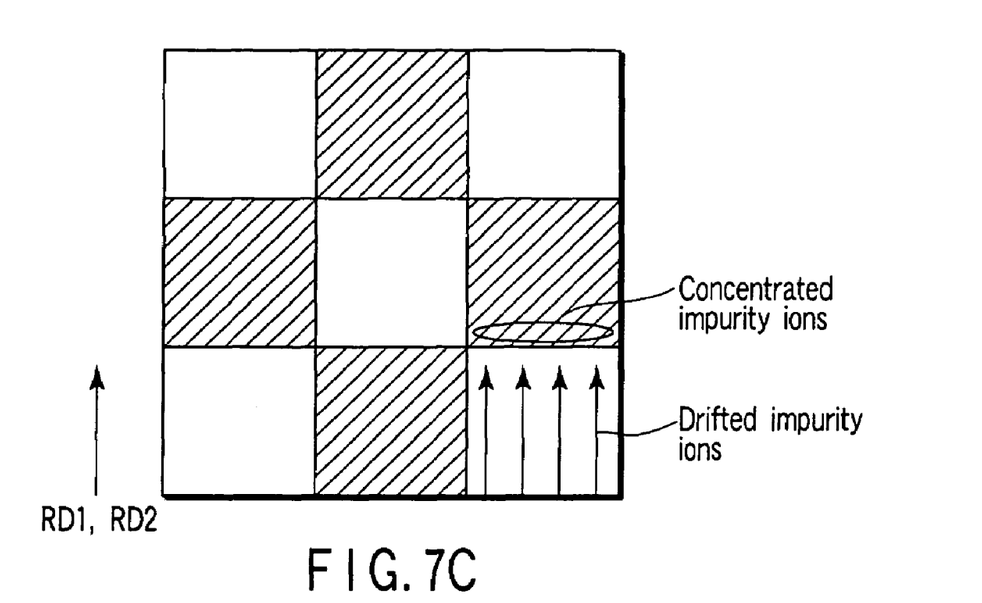
Figure 7D:
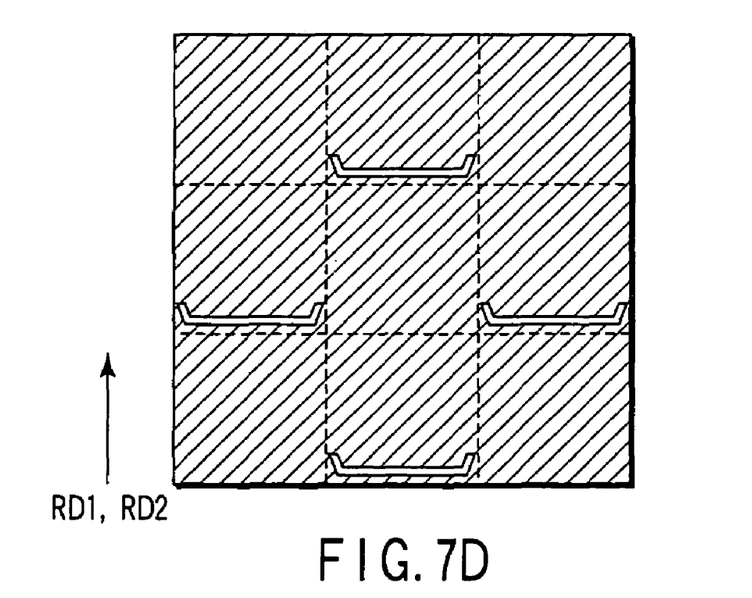

In the OCB mode liquid crystal display panel, liquid crystal molecules within the liquid crystal layer LQ are set in a bend alignment to perform a display operation. The orientation angle of each liquid crystal molecule significantly changes between a white display state in which a small voltage is applied to the liquid crystal layer LQ and a black display state in which a large voltage is applied to the liquid crystal layer LQ. The change in the orientation angle causes drifting of the liquid crystal molecules. Thus, a flow of the liquid crystal molecules in the drift direction occurs in the liquid crystal layer LQ. The direction of this flow coincides with the rubbing directions of the alignment films for aligning the liquid crystal molecules in the OCB mode liquid crystal display panel. When impurity ions are moved by the flow in the rubbing directions RD1 and RD2 shown in FIG. 7A, the impurity ions DF having high concentration in the vicinity of the inlet 4 are diffused in the liquid crystal layer LQ as shown in FIG. 7B. Further, non-uniformity in display occurs because the electric charge retention is locally decreased as a result of continuous black insertion driving. This can be confirmed, for example, by an operation of continuously displaying an image of a test pattern shown in FIG. 7C in the form of black insertion driving and then displaying an image of a whole black pattern. In this case, the later image is not displayed entirely in black, and gray stripes shown in FIG. 7D are observed as burn-in portions. As shown in FIG. 7C, the impurity ions drift from the white display regions and concentrated in the black display regions. The gray stripes are created in portions where the electric charge or applied voltage retention is locally decreased by the concentrated impurity ions.

It is difficult to solve the burn-in problem occurring in the OCB mode liquid crystal display panel by applying a high potential pulse in the same manner as the above-mentioned technique.

BRIEF SUMMARY OF THE INVENTION

It is an object of the present invention to provide an OCB mode liquid crystal display panel that can suppress non-uniformity in display caused by impurity ions when black insertion driving is carried out in a display operation.

According to the invention, there is provided an OCB mode liquid crystal display panel, which comprises: a pair of electrode substrates; a liquid crystal layer which is held between the pair of electrode substrates and has liquid crystal molecules whose alignment state is controlled within a display area by a drive voltage applied from the electrode substrates; and a pair of alignment films which are disposed on the electrode substrates in contact with the liquid crystal layer and whose rubbing directions are set parallel to each other; wherein the rubbing directions of the pair of alignment films are oriented toward a side of a main diffusion source of impurity ions.

With the OCB mode liquid crystal display panel, the rubbing directions of the pair of alignment films are oriented toward a side of a main diffusion source of impurity ions. By the black insertion driving, the impurity ions are moved toward the side of the main diffusion source thereof. This prevents impurity ions having high concentration from diffusing in the entire liquid crystal layer. Accordingly, it is possible to suppress non-uniformity in display caused by the impurity ions entered into the display area, even if the liquid crystal display panel is driven for a long period.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

An OCB mode liquid crystal display panel LCD according to one embodiment of the present invention will be described with reference to the accompanying drawings.

Figure 1:
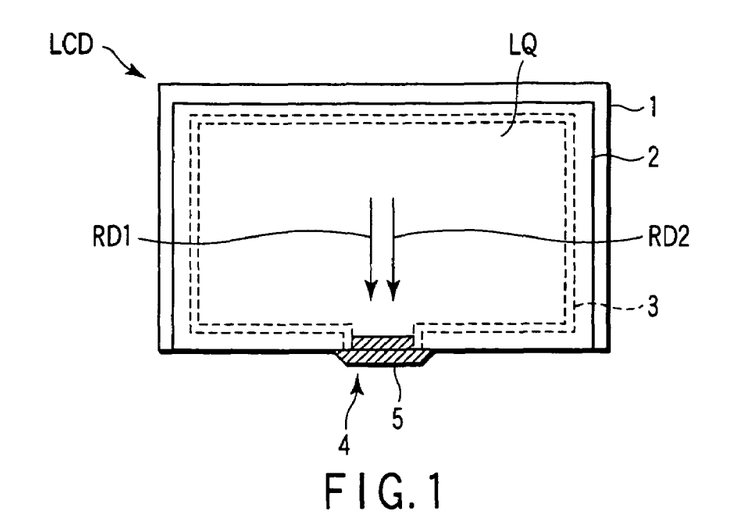
FIG. 1 is a diagram showing the plane structure of an OCB mode liquid crystal display panel according to a first embodiment of the invention.
Figure 2:
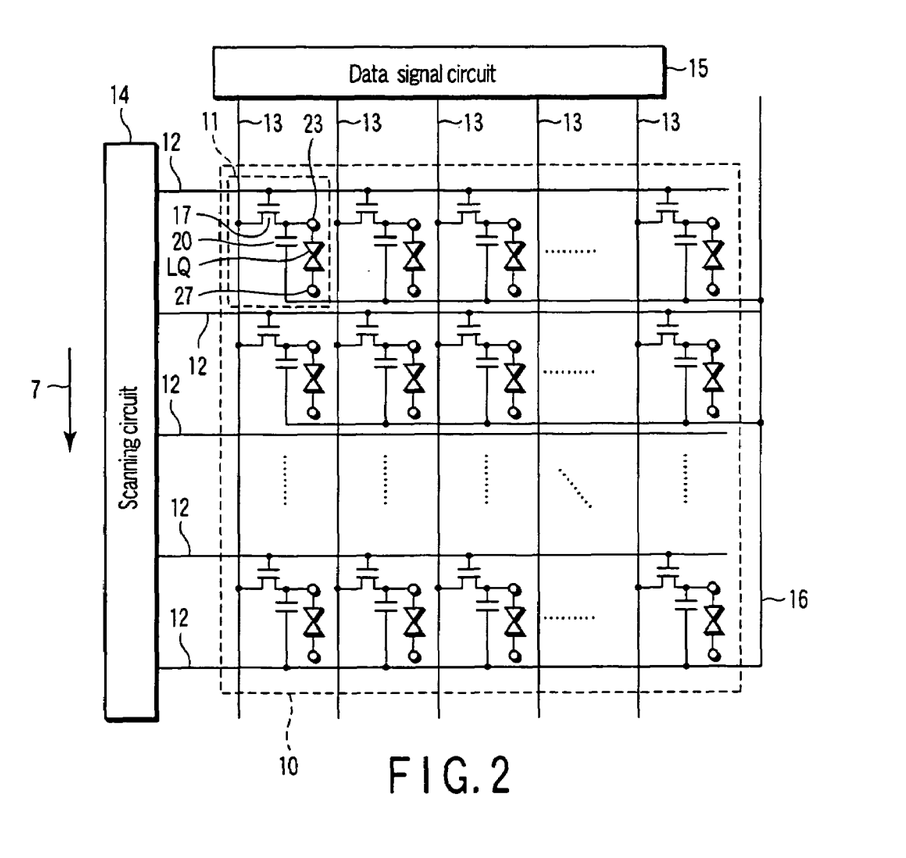
FIG. 2 is a diagram showing the circuit configuration of the liquid crystal display panel shown in FIG. 1.
Figure 3A:
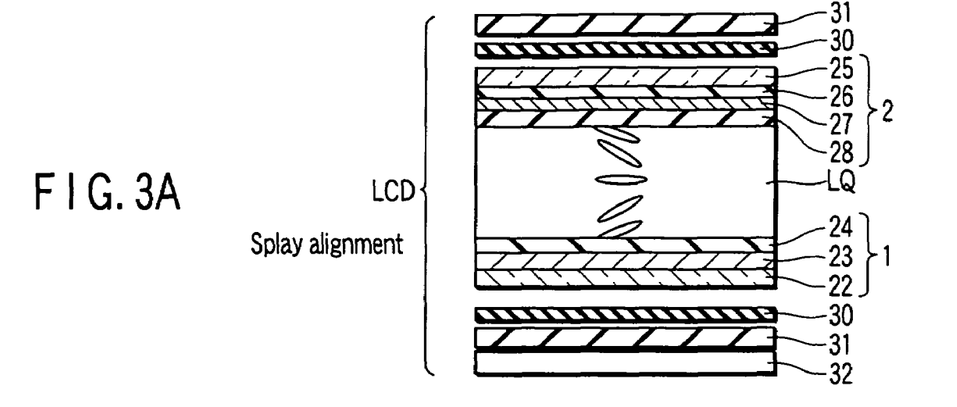
FIGS. 3A to 3C are diagrams showing the cross sectional structure and the liquid crystal alignment of the OCB mode liquid crystal display panel shown in FIG. 1.
Figure 3B:
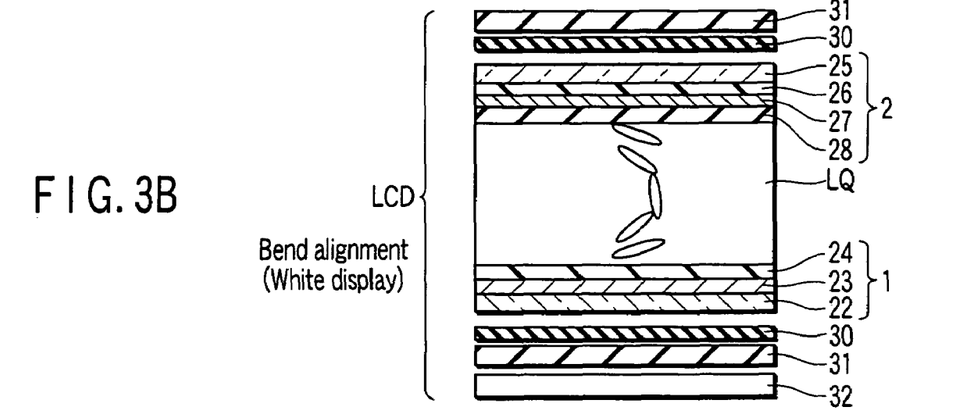
Figure 3C:
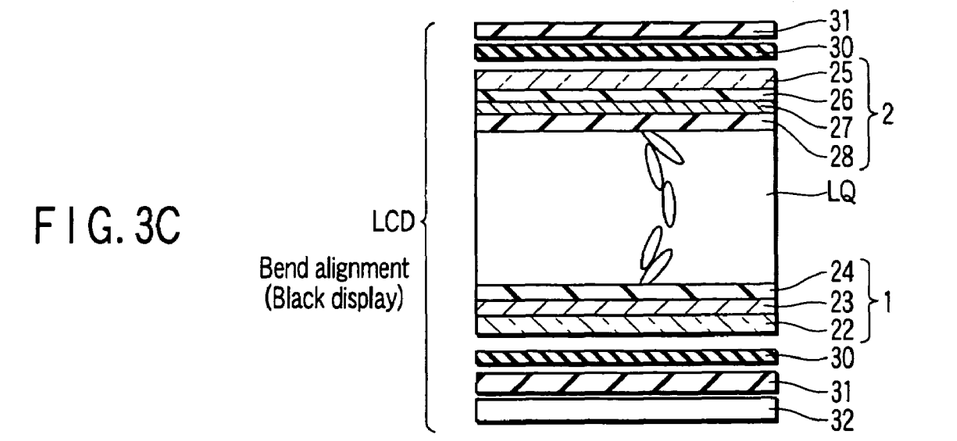

FIG. 1 shows the plane structure of the liquid crystal display panel LCD, FIG. 2 schematically shows the circuit configuration of the liquid crystal display panel LCD, FIGS. 3A to 3C shows the cross sectional structure of the liquid crystal display panel LCD. As shown in FIG. 1, the liquid crystal display panel LCD includes an array substrate 1, a counter substrate 2, and a liquid crystal layer LQ held between the array substrate 1 and the counter substrate 2. The array substrate 1 and counter substrate 2 are a pair of electrode substrates each of which is a rectangular, and bonded by use of a sealing resin layer 3, which is applied to surround a liquid crystal filling space between the substrates 1 and 2 and form an open part left as an inlet 4. The liquid crystal layer LQ is obtained by filling the liquid crystal filling space, for example, with a nematic liquid crystal material from the inlet 4, and sealing the inlet 4 with a sealing member 5. The resin layer 3 is made of thermoset resin, and the sealing member 5 is made of ultraviolet cure resin.

In the liquid crystal display panel LCD, a display screen is formed of a plurality of pixels 11 shown in FIG. 2. The array substrate 1 includes a plurality of pixel electrodes 23 arrayed in a matrix form in a display area 10 corresponding to the display screen, a plurality of scanning electrodes 12 extending along the rows of pixel electrodes 23, a plurality of data signal electrodes 13 extending along the columns of pixel electrodes 23 and a plurality of thin-film transistors (TFTs) 17 disposed near the intersections of the scanning electrodes 12 and the data signal electrodes 13 as pixel switching elements, a plurality of storage capacitances 20 at one end connected to the pixel electrodes 23, a scanning circuit 14 connected to the scanning electrodes, and a data signal circuit 15 connected to the data signal electrodes 13. Each scanning electrode 12 is connected to the gates of the thin-film transistors 17 of a corresponding row, each data signal electrode is connected to the drains of the thin-film transistors 17 of a corresponding column. Each pixel electrode is connected to the source of a corresponding thin-film transistor 17. The storage capacitances are connected at the other end to a common wiring 16. In this case, each thin-film transistor 17 is formed as an n-channel MOS transistor. The counter substrate 2 includes a counter electrode 27 facing the pixel electrodes 23. Each pixel 11 includes the pixel electrode 23, the counter electrode 27, and a part of the liquid crystal layer LQ which is located between the pixel electrode 23 and the counter electrode 27, and forms a liquid crystal capacitance for holding a drive voltage corresponding to a potential difference between the pixel electrode 23 and the counter electrode 27. The storage capacitance 20 is provided in parallel with the liquid crystal capacitance to ensure that the drive voltage is held stably.

The scanning circuit 14 outputs a scanning signal sequentially supplied to the scanning electrodes 12 in a direction 7 shown in FIGS. 1 and 2 for each horizontal scanning period. The data signal circuit 15 converts a video signal for one row to pixel voltages while each of the scanning electrodes 12 is driven by the scanning signal, and outputs the pixel voltages to the data signal electrodes 13. These pixel voltages are applied to the pixel electrodes 23 of the row via the thin-film transistors 17 for one row which are turned on by the scanning signal. The pixel voltage is a voltage applied to the pixel electrode 23 with respect to a common voltage applied to the counter electrode 23 and serving as a reference. The pixel voltage is inverted in polarity against the common voltage for each frame period and for each horizontal scanning period, for example. The transmittance of each pixel 11 is controlled by the drive voltage between the pixel electrode 23 and the counter electrode 27.

As shown in FIG. 3A, in the array substrate 1, the pixel electrodes 23 are formed on a transparent insulating substrate 22 such as a glass substrate, and covered with an alignment film 24. In the counter substrate 2, the counter electrode 27 is formed on a color filter layer 26 covering a transparent insulating substrate 25 such as a glass substrate, and covered with an alignment film 28. The array substrate 1 and the counter substrate 2 are bonded such that the alignment films 24 and 28 are set to be in contact with the liquid crystal layer LQ. The liquid crystal display panel LCD further includes a pair of retardation films 30 for optical compensation, a pair of polarizing plates 31, and a backlight 32 serving as a light source. The pair of retardation films 30 are attached to the transparent insulating substrates 22 and 25 on the sides opposite to the liquid crystal layer LQ, and the pair of polarizing plates 31 are attached to the pair of retardation films 30. The backlight 32 as the light source is disposed next to the polarizing plate 31 on the array substrate 1 side.

In the liquid crystal display panel LCD, the alignment film 24 and the alignment film 28 are subjected to rubbing treatment in directions parallel to each other. In FIG. 1, RD1 denotes the rubbing direction of the alignment film 24, and RD2 denotes the rubbing direction of the alignment film 28. In the rubbing treatment, the rubbing directions RD1 and RD2 are perpendicular to two long sides opposed each other in each of the substrates 1 and 2, and oriented from the long side distant from the inlet 4 to the other long side close to the inlet 4.

With the rubbing treatment of the alignment films 24 and 28, the liquid crystal molecules in the liquid crystal layer LQ are set to the splay alignment shown in FIG. 3A at the initial state. At the initial state, some of the crystal molecules in the liquid crystal layer LQ in the vicinity of surfaces of the alignment films 24 and 28 are held at high pre-tilt angles (5° to 12°) with respect to the surfaces of the alignment films 24 and 28.

Figure 4:
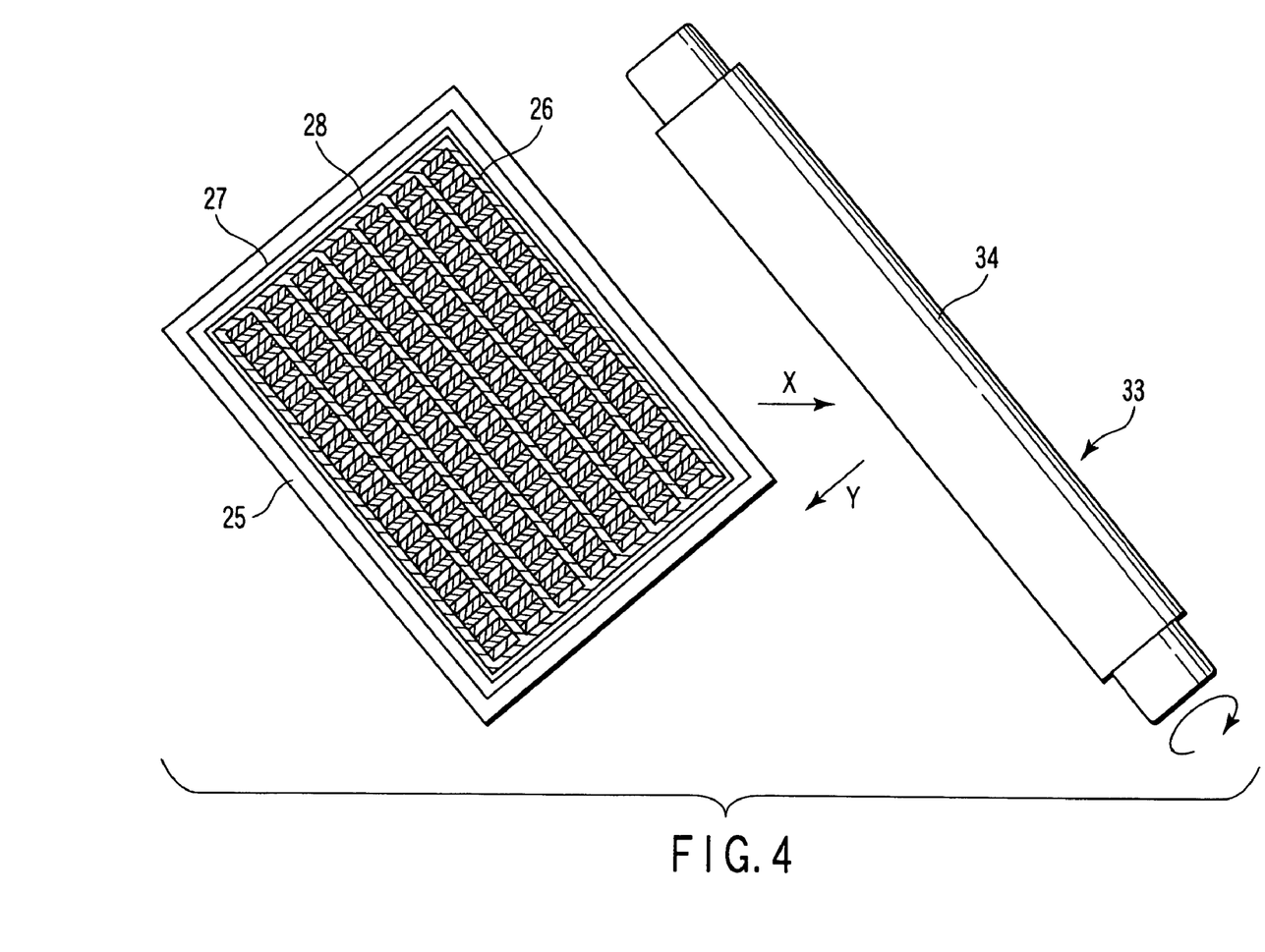
FIG. 4 is a diagram showing rubbing treatment applied to each alignment film shown in FIGS. 3A to 3C.

The above-mentioned rubbing treatment is carried out as shown in FIG. 4. In this rubbing treatment, the array substrate 1 and the counter substrate 2 are prepared in the same manner as other modes, wherein the two alignment films 24 and 28 are deposited by coating the array substrate 22 and the counter substrate 25 with an alignment film material. Each of the array substrate 1 and the counter substrate 2 is placed on a stage unit such that the long sides are set parallel to the rotation axis of a rubbing roller 33, and moved together with the stage unit in the direction of an arrow X across the rubbing roller 33. On the rubbing roller 33, a rubbing cloth is wound. This rubbing cloth is set in contact with the alignment film 24 or 28 and rotates along with the rubbing roller 33. Thus, each of the array substrate 1 and the counter substrate 2 is rubbed in the rotational direction of the rubbing roller 33, that is, the direction of an arrow Y perpendicular to the rotation axis of the rubbing roller 33.

In the liquid crystal display panel LCD, upon supply of power, the scanning circuit 14 and the data signal circuit 15 are configured to perform an initialization process for applying a transfer voltage different from the display voltage to all the pixels 11 as the drive voltage to transfer the alignment state of the liquid crystal molecules from the splay alignment to the bend alignment shown in FIGS. 3B and 3C. FIG. 3B shows the bend alignment obtained upon application of a white display voltage, and FIG. 3C shows the bend alignment obtained upon application of a black display voltage. The white display voltage in the black insertion driving is set to zero or a small value close to zero, and allows the pixel 11 to be in a high luminous state for transmitting light from the backlight 32 at the highest transmittance. If the black insertion driving is not employed, the white display voltage should be set to a small value (in a range, for example, of 1 to 2 V) at which the bend alignment of the liquid crystal molecules would not be inverse-transferred to the splay alignment. In contrast, the black display voltage is a value greater than the white display voltage, and allows the pixel 11 to be in a low luminous state for transmitting light from the backlight 32 at the lowest transmittance. The luminance of each pixel 11 varies in the range between the black display level and the white display level in order to display an image.

Further, the scanning circuit 14 and the data signal circuit 15 are configured to perform the black insertion driving in the display operation after the initialization process. In this black insertion driving, an inverse-transfer preventing voltage identical to the black display voltage is sequentially applied to the rows of pixels 11 (the liquid crystal layer LQ) in the scanning direction 7 at a predetermined black insertion ratio for each frame period. In addition, the scanning circuit 14 is obtained using the thin-film transistors which are formed on the array substrate 1, and the data signal circuit 15 is obtained using a drive IC which is mounted on the array substrate 1 by a COG (Chip On Glass) technique.

In the embodiment, the rubbing directions RD1 and RD2 of the alignment films 24 and 28 are perpendicular to two long sides opposed each other in each of the substrates 1 and 2, and oriented from the long side distant from the inlet 4 to the other long side close to the inlet 4. In general, the impurity ions diffuse from the inlet 4 to the liquid crystal layer. As a result, the concentration of the impurity ions is higher adjacent to or around the inlet 4. When the rubbing directions RD1 and RD2 are determined in the manner described above, the impurity ions are moved towards the inlet 4 by the black insertion driving. Thus, impurity ions having high concentration are prevented from diffusing in the entire liquid crystal layer. In other words, since the rubbing directions RD1 and RD2 coincide with a direction to the substrate side which corresponds to the main diffusion source of the impurity ions, it is possible to suppress non-uniformity in display caused by the impurity ions moved into the display area 10, even if the liquid crystal display panel LCD is driven for a long period.

Figure 5:
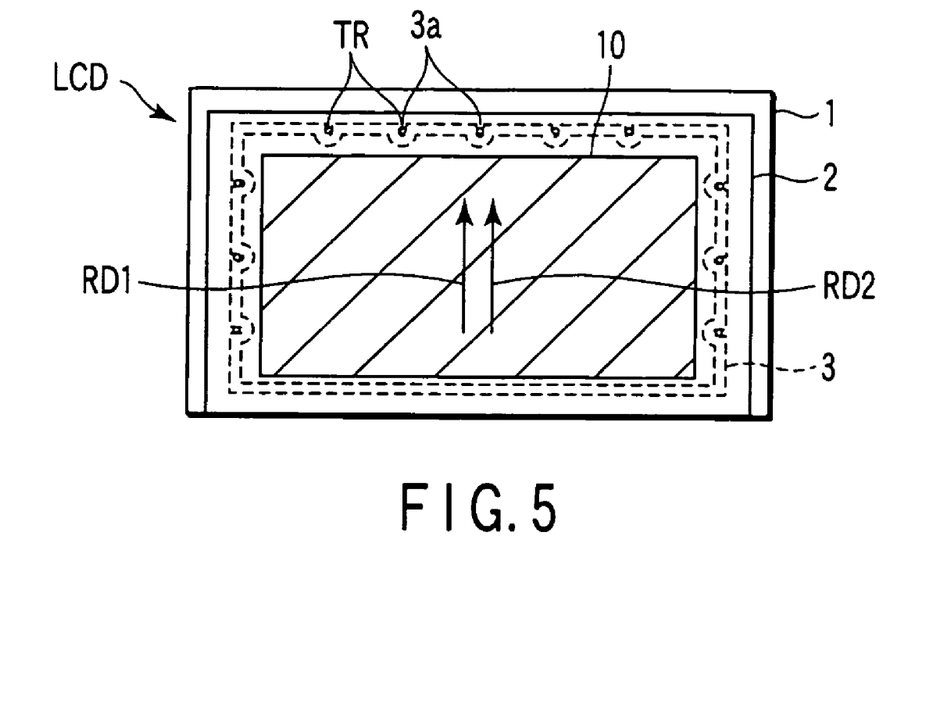
FIG. 5 is a diagram showing the plane structure of an OCB mode liquid crystal display panel according to a second embodiment of the invention.

FIG. 5 shows the plane structure of an OCB mode liquid crystal display panel LCD according to a second embodiment of the invention. The liquid crystal display panel LCD is substantially identical to that of the first embodiment, except for the following features. In FIG. 5, components similar to those in the first embodiment are denoted by the same reference symbols. Thus, the detailed description of the components will be omitted.

In the liquid crystal display panel LCD, the liquid crystal layer is held between the array substrate 1 and the counter substrate 2 in the same manner as the first embodiment. The array substrate 1 and the counter substrate 2 are a pair of electrode substrates, and bonded by use of a sealing resin layer 3, which is applied to fully surround a liquid crystal filling space between the substrates 1 and 2. Filling of the nematic liquid crystal material is carried out by a drop method. In this drop method, the nematic liquid crystal material is dropped into the liquid crystal filling space surrounded by the sealing resin layer 3 before bonding of the substrates 1 and 2. As a result, the liquid crystal layer LQ is obtained without the inlet 4 shown in FIG. 1. The sealing resin layer 3 usually includes bend portions 3a shown in FIG. 5. The bend portions 3a have shapes for making spaces that receive transfer members TR provided along the outer periphery of the liquid crystal layer LQ, and inwardly projected towards the display area 10. The transfer members TR are arranged at a predetermined interval and in parallel with one of the two long sides and each of the two short sides which are opposed in each of the substrates 1 and 2. The transfer members TR are used for obtaining electrical contacts between common wiring pads connected to the common wiring 16 on the array substrate 1 and counter electrode pads connected to the counter electrode 27 on the counter substrate 2. (Although the transfer members TR and the bend portions 3a are also provided in the liquid crystal display panel LCD according to the first embodiment, these components are omitted in FIG. 1.)

When the liquid crystal display has the structure in which the inlet 4 is not provided, the impurity ions generally enter from the sealing resin layer 3 into the liquid crystal layer LQ. The bend portions 3a are inwardly projected towards the display area so that their distance from the display area is shorter than that of the straight portions. As a result, the bend portions 3a permit the impurity ions to enter more easily than the straight portions of the sealing resin layer 3.

In this embodiment, as shown in FIG. 5, the rubbing directions RD1 and RD2 of the alignment films 24 and 28 coincide with a direction to the long substrate side neighboring the largest number of bend portions 3a (the main diffusion source of the impurity ions) which are provided according to the transfer members TR. Thus, the impurity ions are moved in the rubbing directions RD1 and RD2 by the black insertion driving. Accordingly, it is possible to suppress non-uniformity in display caused by the impurity ions entered into the display area 10, even if the liquid crystal display panel LCD is driven for a long period.

Figure 6:
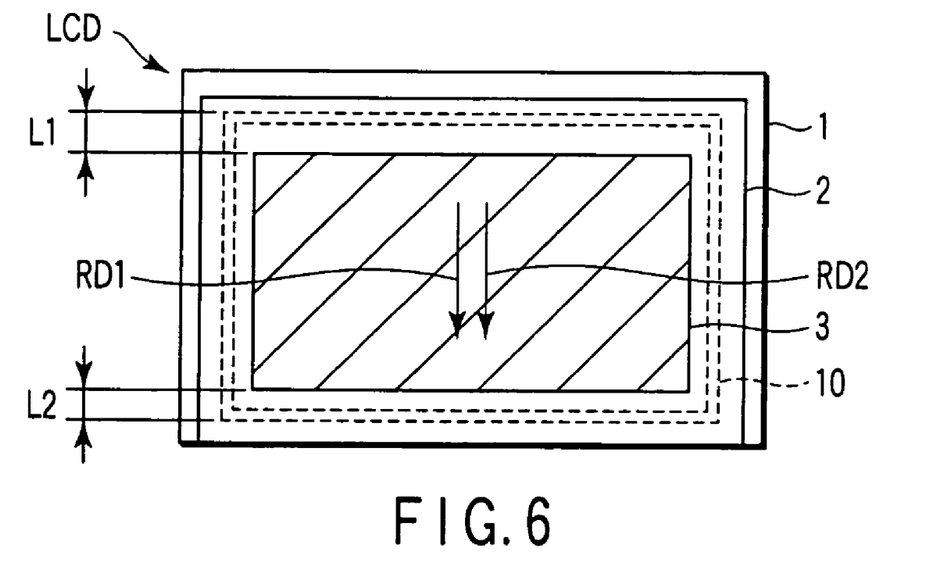
FIG. 6 is a diagram showing the plane structure of an OCB mode liquid crystal display panel according to a third embodiment of the invention.

FIG. 6 shows the plane structure of an OCB mode liquid crystal display panel LCD according to a third embodiment of the invention. The liquid crystal display panel LCD is substantially identical to that of the first embodiment, except for the following features. In FIG. 6, components similar to those in the first embodiment are denoted by the same reference symbols. Thus, the detailed description of the components will be omitted.

In the liquid crystal display panel LCD, the liquid crystal layer is held between the array substrate 1 and the counter substrate 2 in the same manner as the first embodiment. The array substrate 1 and the counter substrate 2 are a pair of electrode substrates, and bonded by use of a sealing resin layer 3, which is applied to fully surround a liquid crystal filling space between the substrates 1 and 2. Filling of the nematic liquid crystal material is carried out by a drop method, in the same manner as the second embodiment. As a result, the liquid crystal layer LQ is obtained without the inlet 4 shown in FIG. 1. (Although the transfer members TR and the bend portions 3a shown in FIG. 5 are also provided in this liquid crystal display panel LCD, these components are omitted in FIG. 6.) The display area 10 is not uniformly distanced from the two long sides of the sealing resin layer 3 corresponding to the two long sides of each of the substrates 1 and 2. More specifically, the display area 10 is separated by a distance L1 from one of the long resin layer sides and separated by a distance L2 shorter than the distance L1 from the other long resin layer side. The impurity ions from the long resin layer side closer to the display area 10 more easily enter the display area 10 than the impurity ions from the other long resin layer side further to the display area 10. In view of the above fact, the long resin layer side separated by the distance L2 from the display area 10 serves as the main diffusion source of the impurity ions.

In this embodiment, as shown in FIG. 6, the rubbing directions RD1 and RD2 coincide with a direction to the long resin layer side which corresponds to the main diffusion source of the impurity ions. Thus, the impurity ions are moved in the rubbing directions RD1 and RD2 by the black insertion driving. Accordingly, it is possible to suppress non-uniformity in display caused by the impurity ions moved into the display area 10, even if the liquid crystal display panel LCD is driven for a long period.

Although the transfer members TR and the bend portions 3a are omitted in FIG. 1, it is preferable that the long substrate side closer to the liquid crystal inlet 4 is identical to the long substrate side neighboring the largest number of bend portions 3a. In this case, by determining the rubbing directions RD1 and RD2 as shown in FIG. 1, the effect of the second embodiment can be obtained in addition to that of the first embodiment. Further, when the display area 10 is arranged with respect to the two long sides of the sealing resin layer 3 to attain a relationship shown in FIG. 5, the effect of the third embodiment can be added.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An OCB mode liquid crystal display panel comprising:
    a pair of electrode substrates;
    a liquid crystal layer which is held between said pair of electrode substrates and has liquid crystal molecules whose alignment state is controlled within a display area by a drive voltage applied from said electrode substrates; and a pair of alignment films which are disposed on said electrode substrates in contact with said liquid crystal layer and whose rubbing directions are set parallel to each other;

wherein said rubbing directions of the pair of alignment films are oriented toward a side of a main diffusion source of impurity ions, said liquid crystal layer is formed of a nematic liquid crystal material applied to a liquid crystal filling space surrounded by a sealing resin layer between said electrode substrates, said main diffusion source of impurity ions is a sealing member that seals a liquid crystal inlet provided in a part of said sealing resin layer.

2. The display panel according to claim 1, wherein each of said electrode substrates is a rectangle having two long sides, and said rubbing directions are substantially perpendicular to said two long sides.

3. The display panel according to claim 1, further comprising a drive circuit configured to periodically apply an inverse-transfer preventing voltage for maintaining the alignment state of the liquid crystal molecules in a bend alignment, as the drive voltage to said liquid crystal layer.

4. An OCB mode liquid crystal display panel comprising:
a pair of electrode substrates;
a liquid crystal layer which is held between said pair of electrode substrates and has liquid crystal molecules whose alignment state is controlled within a display area by a drive voltage applied from said electrode substrates; and
a pair of alignment films which are disposed on said electrode substrates in contact with said liquid crystal layer and whose rubbing directions are set parallel to each other;
wherein said rubbing directions of the pair of alignment films are oriented toward a side of a main diffusion source of impurity ions,
said liquid crystal layer is formed of a nematic liciuid crystal material applied to a liquid crystal filling space surrounded by a sealing resin layer between said electrode substrates,
said main diffusion source of impurity ions is a part of said sealing resin layer in which a plurality of bend portions projecting towards said display area are concentrated.

5. The display panel according to claim 4, wherein each of said electrode substrates is a rectangle having two long sides, and said rubbing directions are substantially perpendicular to said two long sides.

6. The display panel according to claim 4, further comprising a drive circuit configured to periodically apply an inverse-transfer preventing voltage for maintaining the alignment state of the liquid crystal molecules in a bend alignment, as the drive voltage to said liquid crystal layer.

7. An OCB mode liquid crystal display panel comprising:
a pair of electrode substrates;
a liquid crystal layer which is held between said pair of electrode substrates and has liquid crystal molecules whose alignment state is controlled within a display area by a drive voltage applied from said electrode substrates; and
a pair of alignment films which are disposed on said electrode substrates in contact with said liquid crystal layer and whose rubbing directions are set parallel to each other;
wherein said rubbing directions of the pair of alignment films are oriented toward a side of a main diffusion source of impurity ions,
said liquid crystal layer is formed of a nematic liciuid crystal material applied to a liquid crystal filling space surrounded by a sealing resin layer between said electrode substrates,
said main diffusion source of impurity ions is a part of said sealing resin layer which is closest to said display area.

8. The display panel according to claim 7, wherein each of said electrode substrates is a rectangle having two long sides, and said rubbing directions are substantially perpendicular to said two long sides.

9. The display panel according to claim 7, further comprising a drive circuit configured to periodically apply an inverse-transfer preventing voltage for maintaining the alignment state of the liquid crystal molecules in a bend alignment, as the drive voltage to said liquid crystal layer.

* * * * *